United States Patent Office 2,756,624
Patented July 31, 1956

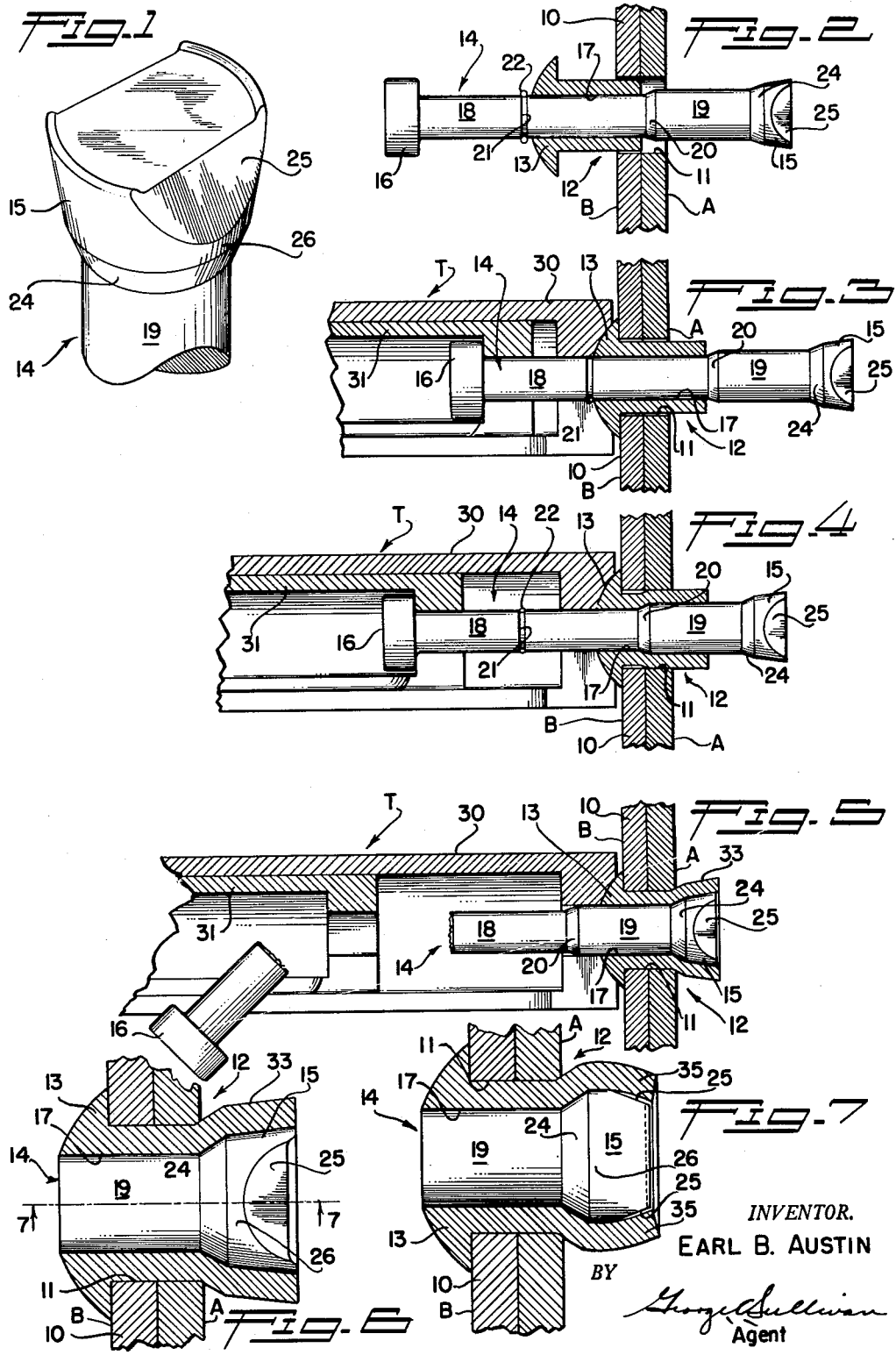

2,756,624

BLIND RIVET WITH LOCKED MANDREL

Earl B. Austin, North Hollywood, Calif., assignor to Lockheed Aircraft Corporation, Burbank, Calif.

Application May 6, 1952, Serial No. 286,275

2 Claims. (Cl. 85—40)

This invention relates to fastening devices and relates more particularly to what are generally known as blind rivets.

Fastening devices, usually called blind rivets, have gone into extensive use in situations where one side of the structure or assembly to be worked upon is inaccessible or impractical to reach with the bucking bars or yokes required for regular riveting. The type of blind rivet with which the invention is primarily concerned is usually called the self-plugging blind rivet and comprises a sleeve or tubular rivet body provided at its outer end with a head for engaging the accessible side of the assembly or work and a stem for extending through the tubular rivet body. The stem has a head on its inner end larger in diameter than the bore in the tubular rivet body, and by pulling the stem outwardly while holding the tubular rivet body against outward movement, this head swells or expands the inner end portion of the tubular body against the blind or inaccessible side of the assembly or work to thus secure the rivet. The stem in addition to having the aforementioned head, is also provided with a shank portion of enlarged diameter that serves to expand the wall of the tubular rivet body against the surface of the opening in the work and thus tighten the rivet in the opening, this operation taking place before the head of the stem expands or forms the head on the inner inaccessible end of the tubular rivet body. Following the expansion of the tubular rivet in the opening and the forming or expanding of the head on the inner inaccessible end of the body the protruding outer portion of the stem is cut off substantially flush with the accessible end of the rivet to complete the rivet installing procedure.

The self-plugging blind rivet has strength characteristics comparable to those of a conventional solid rivet and because the stem tightly fits the bore of the tubular rivet body and the latter tightly fits the opening in the work parts, the rivet is fluid tight, or substantially so, and is useful in pressurized bulkheads, and the like, where it is necessary to retain air or other fluid under pressure. However, there is nothing for positively retaining the stem in the tubular rivet body, the simple frictional engagement of the stem in the bore of the rivet body being relied upon to hold the stem in place. It has been found in installations where there is considerable vibration, for example in aircraft, the stem frequently works loose and falls out of or becomes displaced from the rivet, leaving the bore of the tubular rivet body unoccupied and open so that the air or fluid may freely flow through the rivet. The loss or displacement of the stem also reduces the physical strength of the rivet and, particularly, the shear strength.

It is an object of the present invention to provide a blind rivet of the general character above referred to wherein the stem is positively held or retained against displacement or loss from the tubular rivet body. In the rivet of the invention the portion of the sleeve or tubular body at the inaccessible side of the work and that is expanded in the form of a head by the action of the enlargement or head on the stem has mechanical interference with the said head on the stem to positively hold the stem against movement inwardly or toward the blind side of the work, the natural engagement of the head in the tubular body preventing movement or displacement of the stem in the outward or other direction.

Another object of the invention is to provide a blind rivet of this kind wherein the inner or inaccessible end portion of the tubular rivet body is automatically shaped to have locking engagement with the head of the stem when the stem is pulled outwardly to expand this portion of the body and this automatic shaping of the body part does not in any way weaken the rivet or reduce the amount or area of contact of the rivet body with the inaccessible side of the work.

A further object of the invention is to provide a blind rivet of the character described that is simple and inexpensive to manufacture. The rivet may be manufactured on a mass production basis in the same manner and with the same type of tooling as the blind rivets now in use, only relatively minor changes or differences being required in the dies for forming heads on the rivet stems.

A still further object of the invention is to provide a blind rivet of the character referred to that may be easily and readily installed with the equipment or tools usually provided for installing the self-plugging blind rivets now in use. The self-same tools may be used to install the rivets of the present invention that are employed to install the blind rivets now in use.

Other objectives and features of the invention will become apparent from the following detailed description of a typical rivet of the invention and manner of installing the same as illustrated in the accompanying drawings, wherein:

Figure 1 is an enlarged fragmentary perspective view of the enlargement or head on the inner end of the stem;

Figure 2 is a vertical sectional view showing the tubular rivet body and the stem being inserted in an opening in work parts, the stem appearing in elevation;

Figure 3 is a view similar to Figure 2 showing a tool in position to pull the stem outwardly through the tubular rivet body;

Figure 4 is a view similar to Figure 3 showing the stem being pulled through the rivet body to expand the same in the opening in the work;

Figure 5 is a view similar to Figure 4 showing the inner end portion of the tubular body expanded against the inner side of the work with the outer portion of the stem pulled off or broken away;

Figure 6 is an enlarged vertical sectional view of the completed rivet installation, the stem appearing in side elevation; and Figure 7 is a transverse detailed sectional view taken as indicated by line 7—7 on Figure 6 illustrating the manner in which the inner portion or head of the tubular body engages about or interferes with the stem head to hold the stem against displacement.

It is to be understood that the features of the invention may be incorporated in the so-called blind rivets of different sizes and types and in rivets varying considerably in design. Accordingly the rivet structure illustrated in the drawings is to be considered merely typical and illustrative. Further, the rivets may, of course, be used or installed in materials of different kinds and in assemblies or structures of various types. In the drawings, the assembly or work in which the rivet is to be installed comprises two plates, sheets, or the like, 10, arranged in face to face relation and having an opening 11 passing therethrough. It will be assumed that the side A of the work 10 is inaccessible or difficult of access while the side B is readily accessible.

The blind rivet of the invention may be said to comprise, generally, a sleeve or tubular rivet body 12 having a preformed head 13 at one end and a stem 14 arranged through the body 12 and having a head 15 at its inner end and a head 16 on its outer end.

The rivet body 12 and the stem 14 are usually formed of a selected or required metal such as an aluminum alloy, steel, or the like, it being apparent that the intended application or use often determines the material of which the rivet is constructed. The rivet body 12 is a tubular spool or sleeve-like part having a central longitudinal opening 17 and provided at its outer end with the head 13. The head 13 may be of the countersunk type, the brazier type, or of any selected or required shape and is intended to engage against the accessible side B of the work 10. As manufactured at the factory, the body 12 is of uniform external diameter except for the head 13 and may be received in the opening 11 of the work 10 with substantial or selected clearance. The rivet body 12 is of sufficient length to have a substantial portion protrude from the inner or blind side A of the work 10 when the head 13 is seated against the accessible side B, as shown in Figure 3.

The stem 14 is an elongate member which is formed and assembled at the factory to extend through the tubular rivet body 12. The stem 14 has a major portion 18 which slidably fits the opening 17 of the body 12 and the above mentioned head 16 is formed on the end of this major portion 18. The head 16 may be a simple cylindrical enlargement and is designed to be engaged by the pulling tool for drawing the stem 14 outwardly into the body 12, as will be later described. The stem 14 is further provided with what I will term a plug portion 19 which is larger in diameter than the portion 18 and joins the portion 18 at a tapering or sloping annular shoulder 20. The plug portion 19 extends inwardly from this shoulder 20 to the abovementioned head 15. As will be seen from an inspection of Figures 2 and 3, the plug portion 19 is considerably larger in diameter than the bore 17 of the body 12, as manufactured at the factory, and the function of the plug portion 19 and its shoulder 20 is to swell or expand the wall of the body 12 into tight cooperation with the surface of the opening 11 in the work 10 and to thereafter close, occupy, or plug the bore 17 of the body. In the particular rivet illustrated the major stem portion 18 has a relatively shallow annular groove 21 to facilitate breaking of the stem 14 after the body 12 has been expanded and headed up and one or more stakes or small lugs 22 of metal are struck up from the region of the groove to engage the head 13 so as to loosely hold the body 12 in a preferred position on the stem 14 between the groove and the shoulder 20 for and prior to the operation of expanding and heading up the body 12.

The head 15 at the inner or inaccessible end of the stem 14 contains or embodies features of the invention. The head 15 is preferably an integral part of the stem 14 and is in the nature of an enlargement on the inner extremity of the stem. As mentioned above, the head 15 serves to expand the inner portion of the tubular rivet body 12 to form a flare or head thereon and the head 15 has a sloping or tapered base part 24 for effecting this expansion of the body in part. This tapered part 24 is preferably annular and slopes from the rear extremity of the plug portion 19 to the periphery of the head 15. As will be seen in the drawings, the part 24 slopes or tapers radially outward and away from the work 10. In accordance with the invention the major portion of the head 15, extending from the base part 24 to the extremity of the head, has a tapered surface or periphery. As will be seen from an inspection of Figures 2 to 6 inclusive, the surface of the head 15 tapers in the same direction as the base part 24 but at a much smaller angle. The head 15 is relieved at one or more sides and in the preferred construction illustrated is relieved at two sides or regions, being provided with two diametrically opposite relieving faces 25. While these faces 25 are shown as being flat, they may be of other shapes as their prime purpose or function is to relieve the head in such a manner that the head 33 of the body 12, to be later described, may have portions or wall parts 35 which curve or incline inwardly to cooperate with the head 15 to hold the stem against axial movement in the direction toward the blind or inaccessible side of the work 10. It is to be noted that the edges of the flat faces 25 bite into the inner side wall of tubular rivet 12 to give a locking or wedging action when withdrawal force is applied to stem 14. It is usually preferred to have the faces 25 extend from the inner extremity of the head 15 to adjacent the sloping base part 24. However, as seen at 26, in Figure 1, the faces 25 terminate short of the part 24, leaving a continuous or annular full-diametered region on the head 15 for acting on the body 12. It should be observed that the maximum diameter of the head 15 is no greater than the outside diameter of the tubular rivet body 12 or at least no greater than the diameter of the opening 11 in the work 10.

It is believed that the final configuration and features of the installed rivet will be best understood by describing the manner of installing and forming the rivet and I will proceed with such a description. The rivet as delivered from the factory is as shown in Figure 2 and is initially positioned on the work 10 by inserting the body 12 in the opening 11 of the work. The installing tool T, a portion of which is shown in Figures 3 to 5 inclusive, is of the type usually used for installing such blind rivets and is well known to those skilled in the art. The rivet may either be engaged in the tool T prior to being inserted in the opening 11 or the tool may be engaged on the rivet after it has been placed in the opening. Figure 3 shows the tool T in place on the rivet with an outer tool member 30 engaged against the head 13 and with an inner tool member 31 engaged or hooked over the head 16 of the stem 14. The member 31 is then forcibly pulled outwardly while the part 30 presses inwardly against the head 13 and the resultant relative movement forces the plug portion 19 into the tubular rivet body 12 to expand the same. Figure 4 shows the plug portion with its leading tapered shoulder 20 expanding the rivet body 12 in the opening 11 of the work 10. The actuation of the tool T is continued to bring the tapered end part 24 of the head 15 into the inner end of the body 12 and the part 24 and the head 15 are pulled or forced into the body 12 to expand the rearwardly protruding portion thereof and form the same into a head 33. The action is such that this head 33 tightly grips or clamps against the blind side A of the work 10 while the head 13 clamps against the accessible side B so that the rivet is clinched onto the work 10. At this time it should be observed that the annular base portion of the stem head 15 at the regions 26 serves to assure full annular or circular expansion of the head 33 where the head engages the side A of the work 10, thereby developing full rivet engagement with the work. As best shown in Figures 5, 6 and 7, the expanded rear head 33 of the rivet body 12 closely engages about the stem head 15 and is of substantial length, usually being sufficiently long to completely enclose the head 15, the length of the head 33 being dependent to some extent upon the thickness of the work 10. Figures 5 and 6 illustrate how the head 33 closely conforms to the tapering regions of the stem head 15.

When the head 33 of the body 12 is being formed, as above described, the tapered periphery or surface of the head 15, and more specifically the areas or portions of the periphery between the relieving faces 25 act on the wall of the tubular head 33 and tend to further expand the same. These tapered surface portions of the head 15 being substantially diametrically opposite, tend to give the major rear portion of the tubular head 33 an elliptical or transversely elongated configuration and subject the portions of the tubular head opposite the faces 25 to tension. As a consequence the parts 35 of the head 33 at or opposite the faces bend or curve inwardly toward the central longitudinal axis of the rivet assembly, and upon completion of the rivet installation the head 33 has wall parts 35 which curve over and interfere with or engage the faces 25. This relationship is shown in Figure 7. The inward bending or distortion of the parts 35 is automatic and accompanies the expansion of the body head 33. As will be seen from an inspection of Figure 1, the head 15 provided with the sloping or tapered periphery and the two sloping faces 25, is elongated or substantially rectangular in transverse cross section toward its extremity and when this transversely elongated head is drawn into the tubular body 12 to form the head 33, the surface portions of the head 15 between the two faces 25 form or stretch the walls of the body head 33 to a maximum diameter and elongate the tubular wall transversely. This causes the parts 35 of the body head 33, opposite or at the faces 25, to turn inwardly toward or against the faces 25. These parts 35, bent or turned inwardly against the faces 25, positively hold the stem 14 against inward movement, that is against movement or displacement toward the blind side of the work 10. The stem head 15 engaged in the tubular body head 33 of course positively holds the stem 14 against outward movement or displacement. Thus the stem 14 is definitely and securely retained against axial movement or displacement from the rivet body 12 and is retained where it plugs or seals the tubular rivet body 12 against the loss or leakage of fluid.

After the head 33 has been formed on the body 12 as just described, the continued pull or tension on the stem 14 breaks off the inner end part of the stem at the groove 21 and this part of the stem falls away, as shown in Figure 5, the groove 21 being designed or proportioned to insure full expansion of the head 33 prior to failure or breaking of the stem at the groove. The tool T is then disengaged from the rivet and the portion of the stem 14 that is left projecting from the head 13 may be removed by cutting off the stem flush with the top of the head 13. The final rivet installation is as shown in Figures 6 and 7.

From the foregoing detailed description it will be seen that I have provided a simple, practical and inexpensive blind rivet of the plugging type in which the stem 14 is effectively retained against loss or displacement. Vibration, or the like, even for sustained periods, cannot cause axial movement or loss of the stem 14 from the rivet. It will be observed that the provision of the reverse pitched or tapered periphery of the head 15 and faces 25 require no change or alteration in the mode of manufacture of the body 12 and may be easily and simply provided on the stem 14 at little or no additional cost. Furthermore, the self-locking feature for retaining the stem 14 does not in any way complicate or change the mode of installing the rivet on the work.

Having described only a typical form of the invention I do not wish to be limited to the specific details herein set forth, but with to reserve to myself any variations or modifications that may appear to those skilled in the art and fall within the scope of the following claims.

I claim:

1. A rivet assembly for arrangement in work having an accessible side and another side, comprising a tubular body having an accessible head on one end for engaging the accessible side of the work, said tubular body being of a length sufficient to pass through the work so that the other end of said tubular body extends beyond the work, a stem for engaging in said tubular body having the inner end engageable in said accessible head, an annular base on the outer end of said stem outwardly flaring in a direction away from the inner end of said stem, a head connected to said annular base engageable with said other end of said tubular body and having a flaring side wall, portions of which are relieved, said side wall except said relieved portions flaring in a direction away from the inner end of said stem at a lesser angle than said annular base, said flaring being continuous and annular from said annular base for a substantial distance therefrom, said relieved portions of said side wall tapering inwardly from said continuous annular flaring portion toward the top of said stem head, said relieved portions being faces, the intersections of each face with said flaring portion being at an obtuse angle and forming a sharp edge thereby providing locking edges, whereby, drawing pressure when placed upon said stem, causes the other end of said tubular body to flow about the side wall of said stem and generally to conform to said side wall of said stem head causing said locking edges to engage with the inner surface of said other end of said tubular body whereby a biting action occurs when a withdrawal force is applied to said stem.

2. In combination, a rivet arranged in work having an accessible side and another side comprising a tubular body having an accessible head on one end engaging said accessible side of the work and having a generally cylindrical tubular head on its other end engaging the other side of the work, a stem engaged in said tubular body, an annular base on the outer end of said stem outwardly flaring in a direction away from the accessible side of the work, a head connected to said annular base engaging said tubular head, said stem head having a flaring side wall, portions of which are relieved, said side wall flaring in a direction away from the accessible side of the work and at a lesser angle than said annular base, said flaring being continuous and annular from said annular base for a substantial distance therefrom, said relieved portions of said side wall tapering inwardly from said continuous annular flaring portion toward the top of said stem head, said relieved portions being faces, the intersection of each face with said flaring portion being at an obtuse angle and forming a sharp edge thereby providing locking edges, said tubular head having inner wall portions cooperating with said annular base and with the side wall of said stem head and generally conforming with said flaring and relieved portions to hold said stem against axial movement, whereby, said locking edges provide a biting action when a withdrawal force is applied to said stem.

References Cited in the file of this patent

UNITED STATES PATENTS

| 2,385,831 | Mullgardt | Oct. 2, 1945 |
| 2,501,567 | Huck | Mar. 21, 1950 |

FOREIGN PATENTS

| 504,928 | Great Britain | Dec. 28, 1939 |
| 585,886 | Great Britain | Feb. 27, 1947 |